(12) United States Patent  (10) Patent No.: US 8,424,995 B2
Sugahara  (45) Date of Patent: Apr. 23, 2013

(54) ATTACHABLE MEMBER-RECOGNITION DEVICE AND INK-JET PRINTER PROVIDED WITH THE SAME

(75) Inventor: Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 798 days.

(21) Appl. No.: 12/413,548

(22) Filed: Mar. 28, 2009

(65) Prior Publication Data

US 2009/0244166 A1    Oct. 1, 2009

(30) Foreign Application Priority Data

Mar. 29, 2008 (JP) .................................. 2008-088929

(51) Int. Cl.
*B41J 29/393* (2006.01)
*G03G 15/00* (2006.01)

(52) U.S. Cl.
USPC ............................................. 347/19; 399/12

(58) Field of Classification Search ............ 347/19; 399/12
See application file for complete search history.

(56) References Cited

U.S. PATENT DOCUMENTS 5,761,566 A    6/1998   Suzuki et al.
6,159,394 A   12/2000   Akiyama et al.
6,280,655 B1   8/2001   Xu et al.

FOREIGN PATENT DOCUMENTS

| JP | H09-185311 A | 7/1997 |
| JP | 2000-063824 A | 2/2000 |
| JP | 2001-049251 A | 2/2001 |
| JP | 2001-064638 A | 3/2001 |
| JP | 2002-172796 A | 6/2002 |
| JP | 2004-077396 A | 3/2004 |
| JP | 2006-116778 A | 5/2006 |
| JP | 2006-269118 A | 10/2006 |

OTHER PUBLICATIONS

Japan Patent Office, Notice of Reasons for Rejection in counterpart Patent Application No. JP 2008-088929, mailed Jun. 22, 2010.

*Primary Examiner* — Jannelle M Lebron
(74) *Attorney, Agent, or Firm* — Baker Botts L.L.P.

(57) ABSTRACT

An ink cartridge is formed with an information-engraved section formed to have a predetermined shape. A cartridge-attachment section, to which the ink cartridge is attached, includes a deformable section, a stress light-emitting section which emits light depending on the shape of the information-engraved section by means of a stress received when the deformable section makes contact with the information-engraved section, and a light-receiving sensor which receives the light emitted by the stress light-emitting section to generate a recognition signal corresponding to the information-engraved section. An attachable member-recognition device is provided, which has a relatively cheap and simple structure, which is capable of setting information about an attachable member including, for example, the ink cartridge and a printing paper tray, and which is capable of recognizing the information.

15 Claims, 10 Drawing Sheets

Fig. 4

| AREA | INFORMATION ITEM | LIGHT EMISSION INTENSITY | | |
| --- | --- | --- | --- | --- |
| | | TURNED OFF | MIDDLE | STRONG |
| | | INFORMATION CONTENTS | | |
| P1 | READING OF INFORMATION | — | — | START |
| P2 | INK COLOR | SEE Fig. 5 | | |
| P3 | | | | |
| P4 | CARTRIDGE VOLUME | LARGE | MIDDLE | SMALL |
| P5 | YEAR OF MANUFACTURE | 2008 | 2009 | 2010 |
| P6 | TERM OF MANUFACTURE | EARLY-TERM | MID-TERM | LATER-TERM |
| P7 | READING OF INFORMATION | — | END | — |

Fig. 5

| AREA | LIGHT EMISSION INTENSITY | | | |
|---|---|---|---|---|
| P2 | STRONG | STRONG | STRONG | MIDDLE |
| P3 | TURNED OFF | MIDDLE | STRONG | TURNED OFF |
| INK COLOR | BLACK | CYAN | MAGENTA | YELLOW |

ATTACHABLE MEMBER-RECOGNITION DEVICE AND INK-JET PRINTER PROVIDED WITH THE SAME

CROSS REFERENCE TO RELATED APPLICATION

The present application claims priority from Japanese Patent Application No. 2008-088929, filed on Mar. 29, 2008 the disclosures of which are incorporated herein by reference in its entirety.

BACKGROUND OF THE INVENTION

1. Field of the Invention

The present invention relates to an attachable member-recognition device and an ink-jet printer provided with the same, wherein it is possible to recognize information about an attachable member which is detachably attached, for example, to main body portions of various electric apparatuses, electronic apparatuses, and mechanical apparatuses. When the attachable member is, for example, an ink cartridge of the ink-jet printer, it is possible to recognize, for example, the color of the ink and the volume of the ink. Alternatively, when the attachable member is a printing paper tray, it is possible to recognize, for example, the size of the printing paper.

2. Description of the Related Art

An ink cartridge-detecting apparatus has been hitherto known as an example of those capable of detecting information about an ink cartridge (see, for example, Japanese Patent Application Laid-open No. 2002-172796). The ink cartridge-detecting apparatus is provided, for example, for an ink-jet printer, which makes it possible to recognize information about the an ink cartridge when the ink cartridge is attached to a carriage.

The following method is adopted to recognize the information about the ink cartridge by means of the ink cartridge-detecting apparatus. That is, when the ink cartridge is attached to the carriage, and the carriage is moved in the main scanning direction, then a bar code, which is printed on a bar code label affixed to a side surface of the ink cartridge, is read by a photosensor, and the information about the ink cartridge is recognized on the basis of the scanned bar code.

The bar code is conventionally known, which includes a plurality of black and white bars printed on the label. For example, the information about the ink color is allotted to seventh and eighth areas of first to eighth areas (digits) of the bar code. The setting is made such that the ink color is "black" when the colors of the respective bars in the "seventh area and eighth area" are "black, black". The setting is made such that the ink color is "cyan" when the colors of the respective bars in the "seventh area and eighth area" are "black, white". Further, the setting is made such that the ink color is "magenta" in the case of "white, black", and the ink color is "yellow" in the case of "white, white".

However, in the conventional ink cartridge-detecting apparatus described above, the bar code is read by the photosensor. Therefore, it is necessary to provide the reflection type photosensor which has both of a light-emitting section and a light-receiving section. Therefore, the structure is complicated, and the cost is expensive.

In the case of the bar code, when the black bars and the white bars are printed on the first to eighth areas of the bar code respectively, for example, only two pieces of information, which correspond to the binary value of the black bar or the white bar, can be set for one area.

In other words, when three or more ink colors, for example, four ink colors are set with the bar code, then it is necessary to use, for example, the two areas of "seventh area, eighth area" as in the exemplary conventional technique described above, and it is necessary to use the relatively large number of areas. Therefore, the cost is expensive corresponding thereto, for example, for a control unit of the ink cartridge-detecting apparatus.

SUMMARY OF THE INVENTION

The present invention has been made in order to solve the problem as described above, an object of which is to provide an attachable member-recognition device and an ink-jet printer, wherein the information, which relates to an attachable member including, for example, an ink cartridge and a printing paper tray, can be set and the information can be recognized with a relatively cheap and simple structure.

According to a first aspect of the present invention, there is provided an attachable member-recognition device including:

an attachable member in which an information-engraved section having a predetermined shape is formed;

an attachment section to which the attachable member is detachably attached;

a deformable section which is provided on the attachment section and which is brought into contact with the information-engraved section to deform when the attachable member is attached to the attachment section;

a stress light-emitting portion which is provided with the deformable section and which receives a force, when the deformable section is brought into contact with the information-engraved section, to emit a light, an intensity of the light depending on the shape of the information-engraved section; and a light-receiving sensor which receives the light emitted by the stress light-emitting section and which generates a recognition signal corresponding to the shape of the information-engraved section.

According to the first aspect of the present invention, when the attachable member is progressively attached to the attachment section (main body section, installing section), then the deformable section is deformed by making contact with the information-engraved section, and the force is applied to the stress light-emitting portion. In accordance with the application of the force as described above, the stress light-emitting section can emit the light depending on the shape of the information-engraved portion. The light-receiving sensor receives the light emitted by the stress light-emitting portion to generate the recognition signal corresponding to the information-engraved section. Accordingly, it is possible to recognize the attachable member. Therefore, for example, when the information-engraved sections are provided for a plurality of the attachable members respectively, and the shapes, which are provided for the information-engraved sections to deform the deformable sections, are different from each other beforehand, then the light-receiving sensors can generate the recognition signals corresponding to the shapes of the respective information-engraved sections. Therefore, it is possible to distinguish and recognize the respective attachable members.

According to a second aspect of the present invention, there is provided which jets an ink onto a medium to perform printing, the ink-jet printer includes:

the attachable member-recognition device as defined in the first aspect of the present invention;

an ink-jet head which jets the ink onto the medium; and a transport mechanism which transports the medium.

According to the second aspect of the present invention, the ink-jet printer of the present invention has the attachable member-recognition device according to the present invention. In this arrangement, the stress light-emitting portion emits the light when the stress is applied. Therefore, the light emission function thereof requires no electric wiring. The structure is simple as compared with a case wherein any electric light-emitting device, which requires the electric wiring, is used. It is possible to reduce the cost.

When the information-engraved section, with which the deformable section makes contact, is formed to have such a shape that an intensity of the light emitted by the stress light-emitting portion is varied by the deformation of the deformable section, and the light-receiving sensor receives the light emitted by the stress light-emitting section to generate the recognition signal corresponding to the light emission intensity of the light, then the light emission intensity of the light can be included in the constitutive element of the recognition signal in this arrangement. It is possible to increase the number of the mutually different recognition signals corresponding thereto. Accordingly, a relatively large number of pieces of information about the attachable member can be set on the information-engraved section.

The attachable member, which is included in the attachable member-recognizing mechanism or apparatus according to the present invention, is constructed such that the information-engraved section can allow the stress light-emitting section provided for the main body section to emit the light. Therefore, the information about the attachable member can be transmitted to the main body section in accordance with the way of the light emission of the stress light-emitting section.

BRIEF DESCRIPTION OF THE DRAWINGS

FIGS. 3A and 3B illustrate the principle to read the information about the cartridge by means of the attachable member-recognition device according to the first embodiment, wherein FIG. 3A shows the light intensity in first to seventh areas of an information-engraved section, and FIG. 3B shows a vertical sectional view illustrating the ink cartridge to depict the first to seventh areas of the information-engraved section.

FIG. 4 shows information items and information contents expressed by the information-engraved section provided for the attachable member-recognition device according to the first embodiment.

FIG. 5 shows information items and information contents expressed by the information-engraved section provided for the attachable member-recognition device according to the first embodiment.

FIGS. 8A, 8B and 8C show a printing paper tray according to a third embodiment of the present invention, wherein FIG. 8A shows a plan view illustrating the printing paper tray, FIG. 8B shows a side view illustrating the printing paper tray, and FIG. 8C shows a sectional view taken along VIIIc-VIIIc line in FIG. 8A.

DESCRIPTION OF THE PREFERRED EMBODIMENTS

Figure 1:
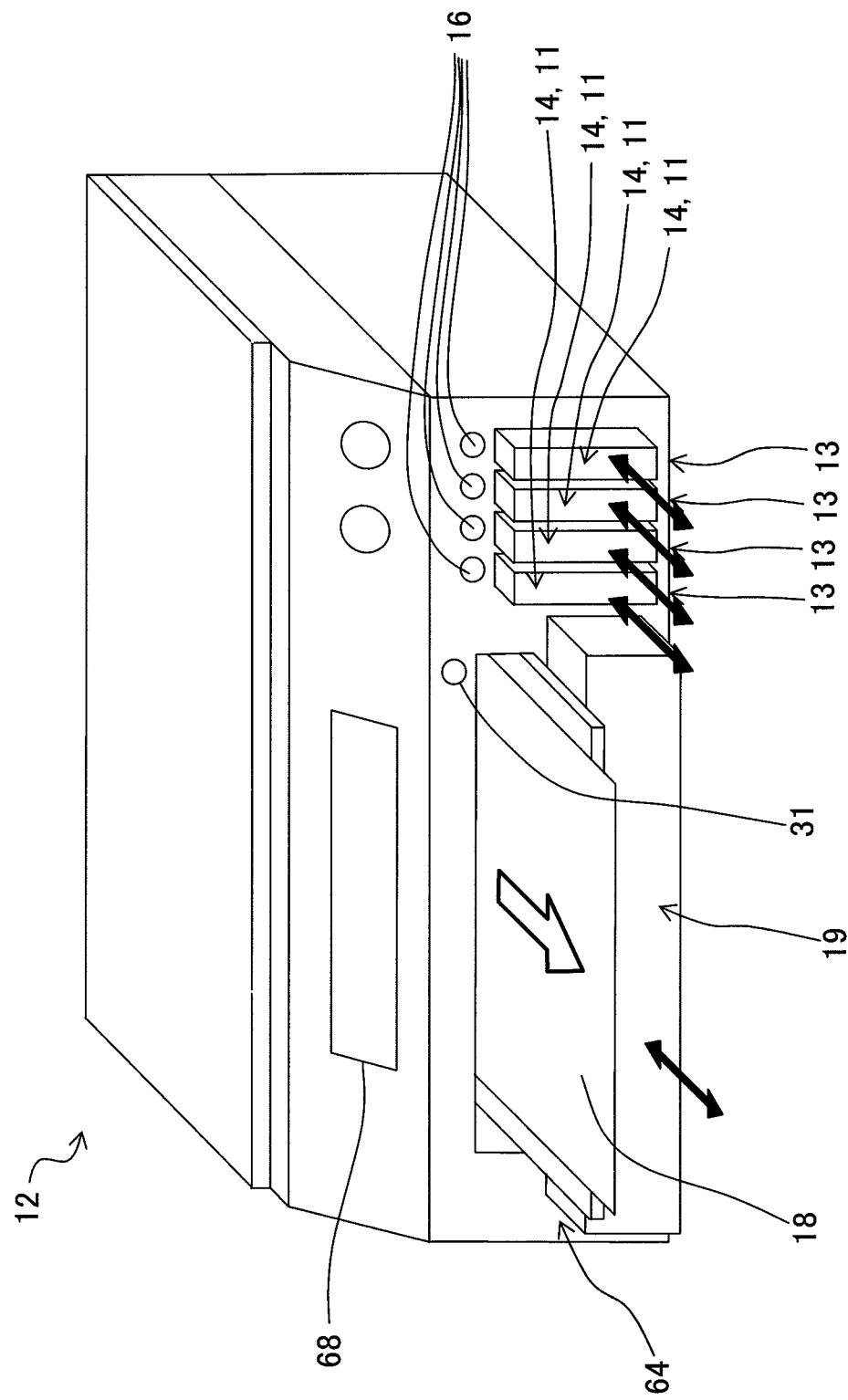
FIG. 1 shows a perspective view illustrating an ink-jet printer to which an attachable member-recognition device and an ink cartridge according to a first embodiment of the present invention are applied.

A first embodiment of an attachable member-recognition device and an attachable member according to the present invention will be explained below with reference to FIGS. 1 to 6. The attachable member-recognition device and the attachable member are applied, for example, to an ink-jet printer 12 as shown in FIG. 1.

The attachable member-recognition device 11 is capable of detecting and recognizing the respective pieces of cartridge information by means of first to fourth light-receiving sensors 15 in relation to first to fourth ink cartridges 14 (attachable members as liquid supply sources) which are detachably attached to first to fourth cartridge-attachment sections (main body sections) 13 provided for the ink-jet printer 12. The cartridge information includes, for example, the ink color, the cartridge volume, the year of manufacture, and the time of year of manufacture.

Figure 2:
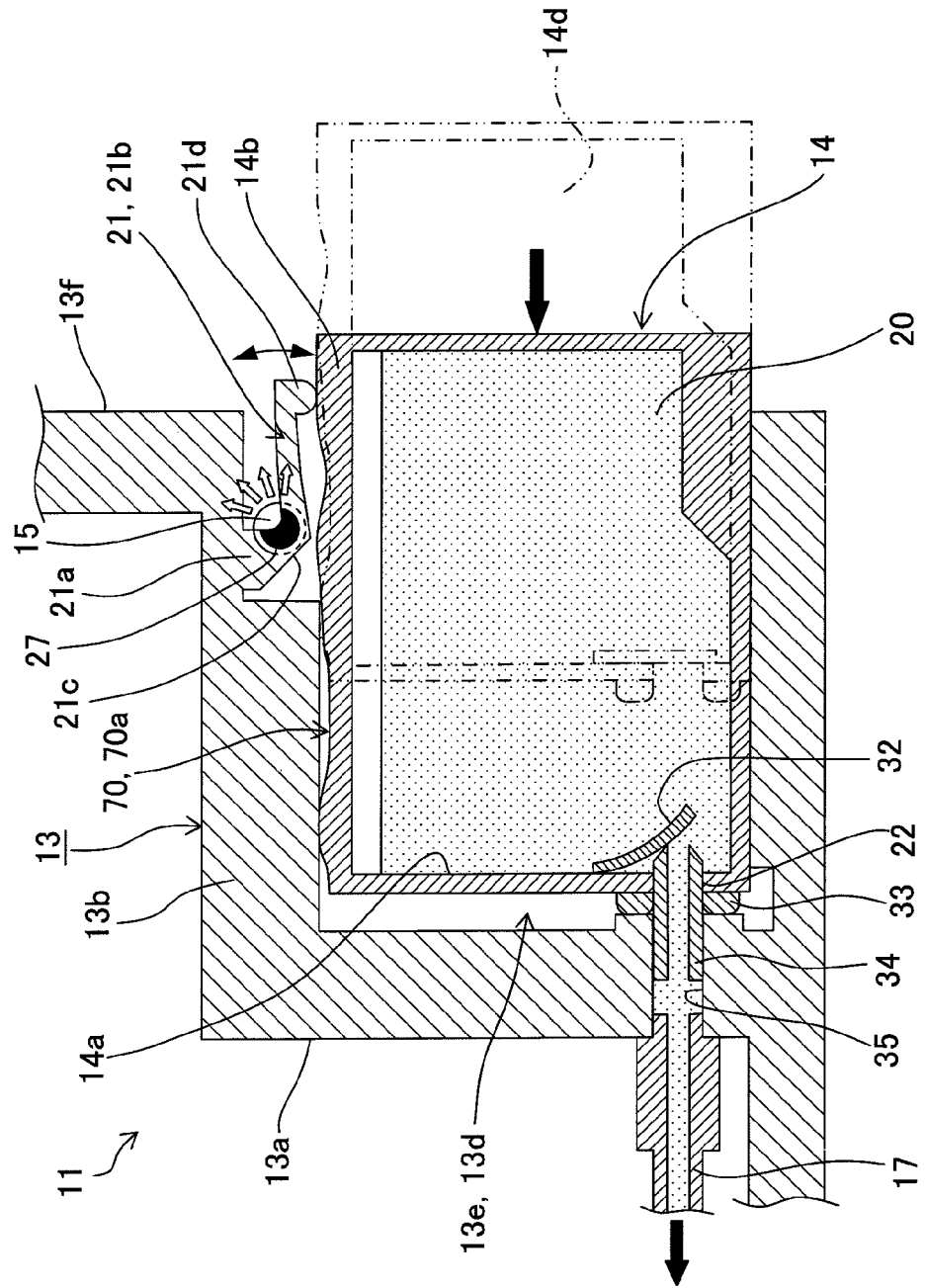
FIG. 2 shows a vertical sectional view illustrating the attachable member-recognition device and the ink cartridge according to the first embodiment.

In other words, as shown in FIG. 2, information-engraved sections 70 are provided one by one for the first to fourth ink cartridges 14. The respective information-engraved sections are formed to have shapes which express or represent the cartridge information of the first to fourth ink cartridges 14. Only the first ink cartridge is shown in FIG. 2.

When the respective first to fourth ink cartridges 14 are progressively attached to the first to fourth cartridge-attachment sections 13, deformable sections 21, which are provided for the respective first to fourth cartridge-attachment sections 13, are deformed by making contact with the respective information-engraved sections 70. Stress light-emitting sections 27, which are provided for the respective deformable sections 21, emit the lights depending on the shapes of the respective information-engraved sections 70 in accordance with the deformation. The lights are received by the first to fourth light-receiving sensors 15. The respective light-receiving sensors 15 generate recognition signals corresponding to the respective information-engraved sections 70. If the recognition signal does not coincide with any one of a plurality of pieces of known data previously stored in a storage section 29, a control unit 28 displays, on a sixth display section 68, a warning indication that the concerning ink cartridge is not appropriate.

The first to fourth ink cartridges 14 are successively arranged from the left side to the right side as shown in FIG. 1. Inks of four colors (black, cyan, magenta, and yellow) are stored in the four first to fourth ink cartridges 14 shown in FIG. 1 respectively. The inks, which are stored in the ink cartridges 14, are supplied to a head unit via four ink supply tubes 17. One of the ink supply tubes 17 is shown in FIG. 2. The inks, which are supplied to the head unit, are discharged from a plurality of nozzle holes which are provided on the lower surface of the head unit. The inks are allowed to blow onto a recording member such as the printing paper 18 to perform the printing. The sheets of the printing paper 18 to be used are stored in a printing paper tray 19.

In this arrangement, the first to fourth ink cartridges 14, the first to fourth cartridge-attachment sections 13, the four deformable sections 21, the four stress light-emitting sections 27, and the first to fourth light-receiving sensors 15 are equivalent to one another respectively. Therefore, the first ink cartridge 14, the first cartridge-attachment section 13, one of the deformable sections 21, one of the stress light-emitting sections 27, and the first light-receiving sensor 15 will be explained with reference to FIG. 2. Any explanation will be omitted about the second to fourth ink cartridges 14, the second to fourth cartridge-attachment sections 13, the deformable sections 21, the stress light-emitting sections 27, and the second to fourth light-receiving sensors 15 other than the above.

Alternate long and two short dashes lines shown in FIG. 2 depict a vertical sectional view illustrating a state in which an operator inserts the first ink cartridge 14 into the first cartridge-attachment section 13 to move the first ink cartridge 14 to a position in front of the installation position. Solid lines shown in FIG. 2 depict a vertical sectional view illustrating a state in which the operator has attached the first ink cartridge 14 to the first cartridge-attachment section 13.

As shown in FIG. 2, the first ink cartridge 14 is a case made of synthetic resin having a substantially rectangular parallelepiped shape with a horizontal length longer than a vertical length. The black ink 20 is stored in a storage chamber provided therein. The information-engraved section 70 is provided on the upper surface of an upper wall section 14b, and an ink supply port 22 is provided at a lower portion of a back wall section 14a. Although not shown, a fixing recess and a disengaging recess are formed to fix and disengage the first ink cartridge 14, respectively, at the predetermined installation position (position shown by solid lines in FIG. 2) in the first cartridge-attachment section 13. In this embodiment, the fixing recess is included in a fixing mechanism which is provided to fix the first ink cartridge 14. The disengaging recess is included in a disengaging mechanism which is provided to detach or take out the first ink cartridge 14 attached to the first cartridge-attachment section 13. The fixing mechanism and the disengaging mechanism are provided at the upper wall section 13b of the first cartridge-attachment section 13 and the upper wall section 14b of the first ink cartridge 14.

As shown in FIG. 2, the upper surface of the information-engraved section 70 is formed as a contact section 70a. The contact section 70a is formed to have a wavy shape so that the position, which is in the direction (upward-downward direction as shown in FIG. 2) perpendicular to the attachment direction of the first ink cartridge 14 to the first cartridge-attachment section 13, is changed as the first ink cartridge 14 is advanced in the attaching direction. The shape of the contact section 70a of the information-engraved section 70 is formed to provide the shape corresponding to the information about the first ink cartridge 14.

In this embodiment, the information, which is engraved on the information-engraved section 70 and which relates to the first ink cartridge 14, includes, for example, the ink color (black, cyan, magenta, or yellow), the cartridge volume (large, middle, or small), the year of manufacture (2008, 2009, or 2010), and the time of the year of manufacture (early-term, mid-term, or later-term).

As shown in FIG. 2, the deformable section 21 has a bent structure having a substantially L-shaped form. The deformable section 21 is principally provided with a proximal end section (base section) 21a and a forward end section 21b, and the both sections are jointed perpendicularly with each other. The proximal end section 21a is joined to the inner lower surface of the upper wall section 13b of the first cartridge-attachment section 13. The proximal end section 21a protrudes toward the information-engraved section 70 of the first ink cartridge 14 to be arranged thereunder during/after the installation. The forward end section 21b is formed to extend by a predetermined length in the rightward direction in FIG. 2 from the proximal end section 21a. The tip 21d, which is provided at the tip of the forward end section 21b, is formed to be pressed against the contact section 70a of the information-engraved section 70 of the first ink cartridge 14. The deformable section 21 is elastically deformed while the tip 21d of the deformable section 21 is pressed against the information-engraved section 70. More specifically, the tip 21d is positioned at the position which is disposed below the proximal end section 21a and which is disposed below the contact section 70a of the first ink cartridge 14 during the installation of the first ink cartridge 14 to the first cartridge-attachment section 13. Accordingly, the elastic deformation of the forward end section 21b, which is caused when the tip 21d is allowed to make contact with the contact section 70a of the first ink cartridge 14 to be attached, is utilized to press the tip 21d against the contact section 70a. Accordingly, when the first ink cartridge 14 is attached, the tip 21d can be allowed to correctly follow the contact section 70. That is, the tip 21d can be kept contacting with the contact section 70 during the installation of the first ink cartridge 14. Therefore, the stress light-emitting section 27 can be allowed to correctly emit the light at a desired intensity (intensity corresponding to the shape of the contact section 70a) as described later on.

In other words, the deformable section 21 realizes the deformation-enhancing structure by means of the bent structure. The deformation-enhancing structure herein means the structure which is greatly deformed when the pressing force is applied to the forward end section. The forward end section 21b extends in parallel to the attaching direction of the first ink cartridge 14. In other words, the forward end section 21b is formed to extend in the longitudinal direction of the horizontal cross section of the first ink cartridge 14. Further, in other words, the forward end section 21b extends in the longitudinal direction of the cross section (horizontal cross section), of the installation hole 13e in which the first ink cartridge 14 is attached, in the direction parallel to the attaching direction.

As shown in FIG. 2, the stress light-emitting section 27 is provided at an inner portion of the bent section (stress-concentrating section) 21c formed for the substantially L-shaped deformable section 21. The stress light-emitting section 27 is formed of a material which emits the light when the stress is applied as described later on.

As shown in FIG. 2, the deformable section 21 provides the deformation-enhancing structure. Therefore, when the first ink cartridge 14 is progressively attached to the first cartridge-attachment section 13, the tip 21d makes contact with the wavy shaped contact section 70a formed on the upper surface of the information-engraved section 70 which is arranged on the upper surface of the first ink cartridge 14. Therefore, the deformable section 21 can be greatly deformed by the force received by the contact. The deformation of the deformable section 21 applies the stress to the stress light-emitting section 27 to emit the light. Therefore, when the length and/or the thickness of the forward end section 21b of the deformable section 21 is/are adjusted, the stress having a required magnitude or strength can be applied to the stress light-emitting section 27. As a result, it is possible to emit the light at a required light emission intensity (luminance).

The inner portion of the bent section 21c which serves as the stress-concentrating section is the portion of the deformable section 21 on which the stress is most concentrated when the tip 21d of the deformable section 21 makes contact with the contact section 70a of the information-engraved section 70 and when the force is received. Therefore, owing to the stress light-emitting section 27 provided at the concerning portion, it is possible to allow the stress light-emitting section 27 to emit the light efficiently.

When the first ink cartridge 14 is progressively attached, then the tip 21d of the deformable section 21 is moved in the upward direction by being pressed by the contact section 70a having the wavy shape on the upper surface of the information-engraved section 70, or the tip 21d of the deformable section 21 is moved in the downward direction in which the shape is restored to the original shape by means of the elastic force of the deformable section 21. However, the information-engraved section 70 is formed so that the velocity of change of the stress applied to the stress light-emitting section 27 during this process is changed. The light emission intensity (luminance) of the stress light-emitting section 27 is changed depending on the velocity of change of the stress.

Owing to the stress light-emitting section 27 as described above, when the tip 21d of the deformable section 21 ascends or descends the steep slope formed on the upper surface of the information-engraved section 70 when the first ink cartridge 14 is progressively attached to the first cartridge-attachment section 13, then the velocity of increase or the velocity of decrease in the stress applied to the stress light-emitting section 27 is relatively large, and the stress light-emitting section 27 emits the light at a relatively large light emission intensity. When the tip 21d of the deformable section 21 ascends or descends the gentle slope formed on the upper surface of the information-engraved section 70, then the velocity of increase or the velocity of decrease in the stress applied to the stress light-emitting section 27 is relatively small, and the stress light-emitting section 27 emits the light at a relatively small light emission intensity. When the tip 21d of the deformable section 21 is moved on the flat surface formed on the upper surface of the information-engraved section 70, then the stress, which is applied to the stress light-emitting section 27, is not changed, and hence the stress light-emitting section 27 does not emit the light, which is in the state of being turned off. The light, which is emitted by the stress light-emitting section 27, is received by the first light-receiving sensor 15.

The first light-receiving sensor 15 is an optical sensor. The first light-receiving sensor 15 receives the light emitted by the stress light-emitting section 27 to generate the recognition signal corresponding to the light emission intensity of the light. Therefore, when the light emission intensity of the light emitted by the stress light-emitting section 27 is relatively large or small, then the first light-receiving sensor 15 receives the light, and the first light-receiving sensor 15 can generate a relatively large or small recognition signal corresponding to the light emission intensity of the light.

As shown in FIG. 2, the first light-receiving sensor 15 is arranged, on the upper wall section 13b of the first cartridge-attachment section 13, at a position at which the light emitted by the stress light-emitting section 27 provided for the deformable section 21 can be received while the first ink cartridge 14 is progressively attached to the first cartridge-attachment section 13. Although not shown, the second to fourth light-receiving sensors 15 are provided on the upper wall section 13b of the second to fourth cartridge-attachment sections 13, respectively, in the same manner as described above. The first to fourth light-receiving sensors 15 are electrically connected to the control unit 28 provided for the ink-jet printer 12.

Figure 6:
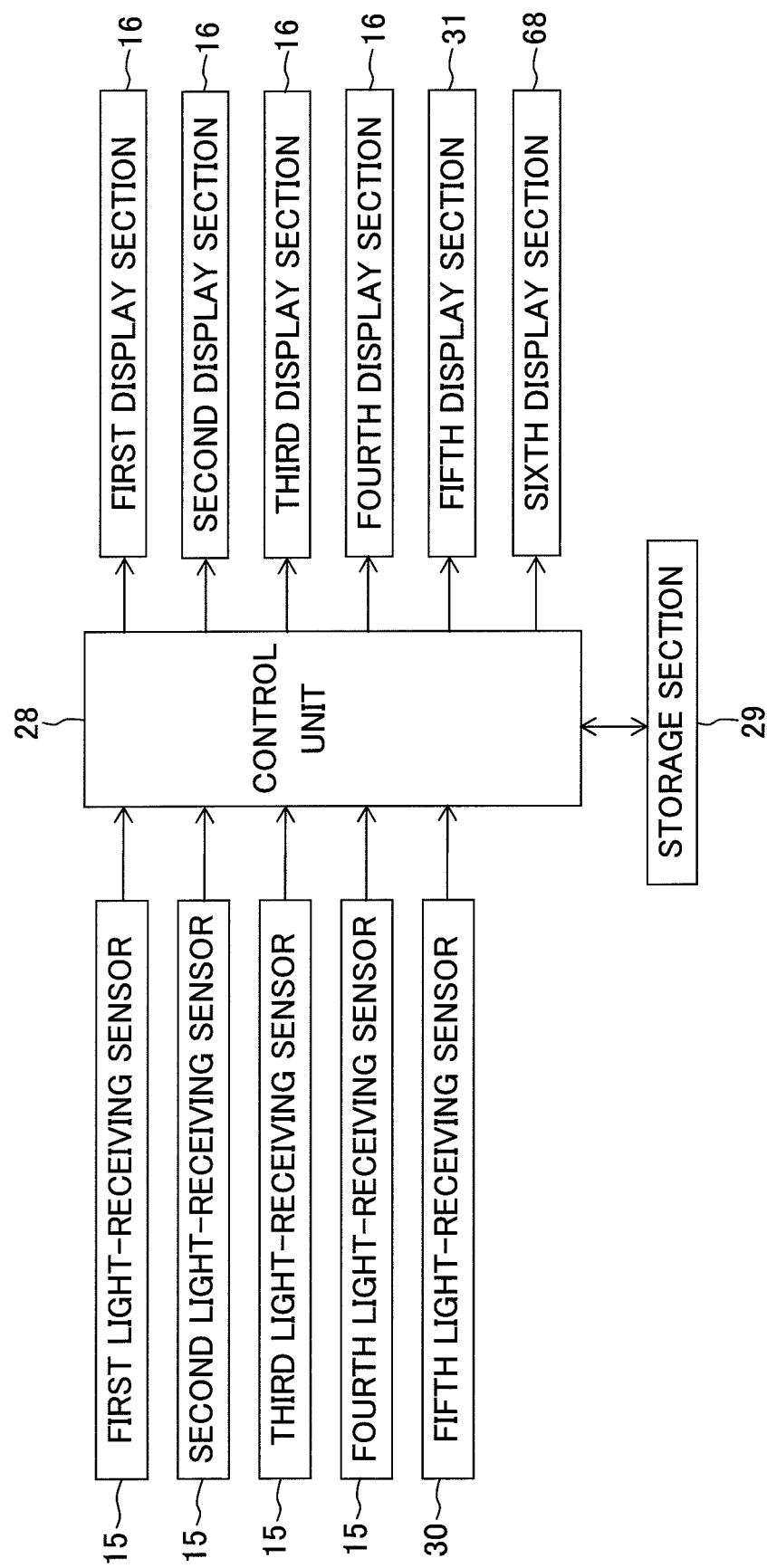
FIG. 6 shows a block diagram illustrating an electric circuit provided for the attachable member-recognition device according to the first embodiment.

The control unit 28 is shown in FIG. 6. The control unit 28 is composed of, for example, a central processing unit (CPU), and the control unit 28 includes a recognition section and a warning section. The first to fourth light-receiving sensors 15, the first to fourth display sections 16, the sixth display section 68, and the storage section 29 are electrically connected to the control unit 28. The storage section 29 previously stores, for example, the control program for the ink-jet printer 12 and the contents to be displayed on the first to fourth display sections 16 and the sixth display section 68. A fifth light-receiving sensor 30 and a fifth display section 31 will be described later on.

Next, the recognition section and the warning section included in the control unit 28 will be explained. The recognition section is capable of recognizing the information about the respective ink cartridges 14 when the first to fourth ink cartridges 14 are attached to the first to fourth cartridge-attachment sections 13. Predetermined displays are displayed on the first to fourth display sections 16 on the basis of the result of the recognition.

For example, when the ink cartridge 14, which has the appropriate "ink color", the "cartridge volume", the "year of manufacture" and the "time of the year of manufacture" as determined beforehand, is attached to the cartridge-attachment section 13, any one of the first to fourth display sections 16, which corresponds to the concerning cartridge-attachment section 13, can be turned on blue or green. If any inappropriate ink cartridge 14 having any different color is attached, any one of the first to fourth display sections 16, which corresponds to the concerning cartridge-attachment section 13, can be turned on red.

If the inappropriate ink cartridge 14 is attached, for example, the warning indication, which is, for example, "unusable, please exchange ink cartridge with regular one (having appropriate color)", is displayed by the warning section on the sixth display section 68 to inform the operator. In this case, the warning section controls the ink-jet printer 12 so that the ink-jet printer 12 is not operated. On the other hand, when the regular ink cartridge 14 is attached, the warning section controls the ink-jet printer 12 so that the ink-jet printer 12 can be operated.

The judgment to judge whether or not the ink cartridge 14 attached to the cartridge-attachment section 13 is appropriate can be performed by comparing the recognition signal which indicates the information about the concerning ink cartridge 14, for example, with a plurality of pieces of known data stored in the storage section 29. If it is judged that the recognition signal is different from the known data, it is judged that the concerning ink cartridge 14 is not appropriate. If it is judged that the known data, which coincides with the recognition signal, is present, it is judged that the concerning ink cartridge 14 is appropriate.

Next, an explanation will be made with reference to FIGS. 3 and 4 about the information-engraved section 70 and the information about the cartridge signified or expressed by the information-engraved section 70. FIG. 3B shows a vertical sectional view illustrating the first ink cartridge 14 having the upper surface on which the information-engraved section 70 is formed.

Figure 3A:
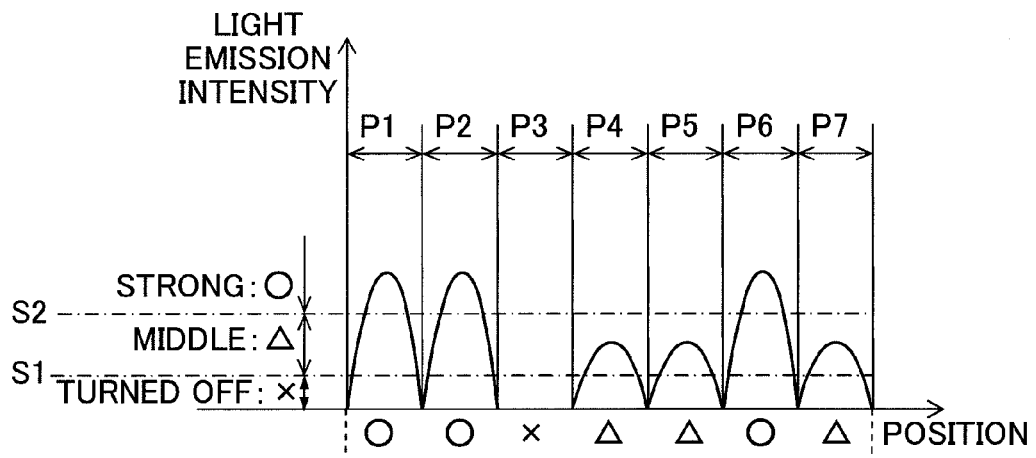
Figure 3B:
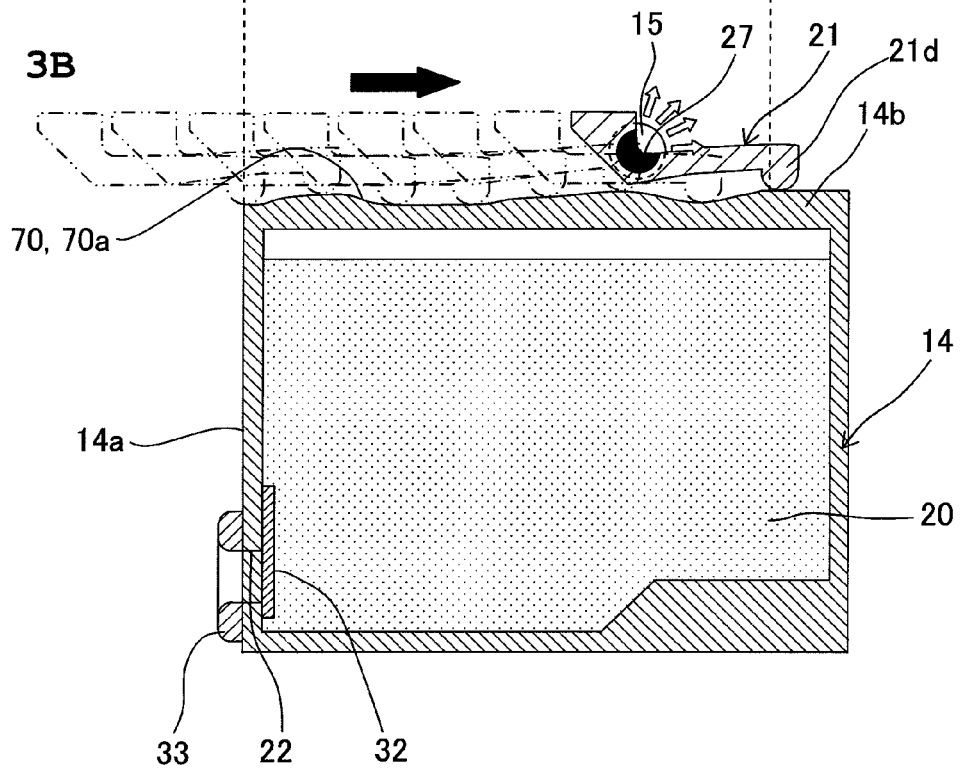

FIG. 3A shows the situation in which the tip 21d of the deformable section 21 makes contact with the contact section 70a of the information-engraved section 70 to deform the deformable section 21, and the stress is applied to the stress light-emitting section 27 in accordance with the deformation to emit the light, when the first ink cartridge 14 is progressively attached to the first cartridge-attachment section 13 as shown in FIG. 3B. However, in FIGS. 3A and 3B, the first ink cartridge 14 is fixed, and the tip 21d of the deformable section 21 is moved in the detaching direction opposite to the direction of installation in such a state that the tip 21d of the deformable section 21 is allowed to abut against the information-engraved section 70.

As shown in FIGS. 3A and 3B, the information-engraved section 70 is comparted into first to seventh areas P1 to P7. The first, second, and sixth areas P1, P2, P6 are formed such that the deformable section 21 is deformed quickly to provide a large velocity of change of the stress applied to the stress light-emitting section 27 when the tip 21d of the deformable section 21 is moved in the areas P1, P2, P6, and the stress light-emitting section 27 consequently emits the light at a "strong" light emission intensity.

The fourth, fifth, and seventh areas P4, P5, P7 are formed such that the deformable section 21 is deformed to a middle or intermediate extent to provide a middle or intermediate velocity of change of the stress applied to the stress light-emitting section 27 when the tip 21d of the deformable section 21 is moved in the areas P4, P5, P7, and the stress light-emitting section 27 consequently emits the light at a "middle" light emission intensity.

The third area P3 is formed such that the deformable section 21 is not deformed to provide zero velocity of change of the stress applied to the stress light-emitting section 27 when the tip 21d of the deformable section 21 is moved in the area P3, and the stress light-emitting section 27 consequently emits no light, which is "turned off".

The judgment to determine whether the light emission intensity of the stress light-emitting section 27 is "strong", "middle", or "turned off" is performed by the recognition section included in the control unit 28 shown in FIG. 6. As shown in FIG. 3A, the recognition section judges that the light emission intensity is "strong" when the light emission intensity of the stress light-emitting section 27 is not less than a second threshold value S2. The recognition section judges that the light emission intensity is "middle" when the light emission intensity is not less than a first threshold value S1 and less than the second threshold value S2. The recognition section judges that the light emission intensity is "turned off" when the light emission intensity is less than the first threshold value S1. When the recognition section judges the light emission intensity, the calculation is performed to compare the recognition signal generated by the light-receiving sensor 15 with the magnitudes of the first and second threshold values S1, S2.

FIGS. 4 and 5 show the information items allotted to the respective first to seventh areas P1 to P7 formed on the contact section 70a of the information-engraved section 70 and the information contents determined for the light emission intensities in the areas P1 to P7. The information shown in FIGS. 4 and 5 and the first and second threshold values S1, S2 are stored in the storage section 29 shown in FIG. 6.

As shown in FIG. 4, in the first area P1 of the information-engraved section 70, if the information item is the "reading of information" and it is judged that the light emission intensity is "strong", then the recognition section executes the reading of the information items and the information contents of the following second to seventh areas P2 to P7. If it is judged that the light emission intensity is "turned off" or "middle", the reading is not executed.

In the second and third areas P2, P3 of the information-engraved section 70 shown in FIG. 4, the information item is the "ink color", and the information contents are as shown in FIG. 5. That is, for example, if it is judged by the recognition section that the light emission intensities of the second and third areas P2, P3 are "strong" and "turned off", it is admitted that the ink color stored in the ink cartridge is "black". If it is judged that the light emission intensities are "strong" and "middle", it is admitted that the ink color is "cyan". If it is judged that the light emission intensities are "strong" and "strong", it is admitted that the ink color is "magenta". If it is judged that the light emission intensities are "middle" and "turned off", it is admitted that the ink color is "yellow".

In the fourth area P4 of the information-engraved section 70, the information item is the "cartridge volume", and the information contents are as shown in FIG. 5. That is, for example, if it is judged by the recognition section that the light emission intensity of the fourth area P4 is "turned off", it is admitted that the ink volume of the ink cartridge is "large". If it is judged that the light emission intensity is "middle", it is admitted that the ink volume is "middle". If it is judged that the light emission intensity is "strong", it is admitted that the ink volume is "small".

Similarly, in the followings, the information items and the information contents of the fifth and sixth areas P5, P6 of the information-engraved section 70 are the year of manufacture (2008, 2009, or 2010) and the time of the year of manufacture (term of manufacture; early-term, mid-term, or later-term). The respective information contents are admitted in accordance with the light emission intensities.

In the seventh area P7 of the information-engraved section 70, the information item is the "reading of information (end of information)". If it is judged that the light emission intensity is "middle", the reading of the information items and the information contents by the recognition section comes to an end.

Further, if it is judged by the recognition section that the light emission intensity in the seventh area P7 is "middle", and it is judged that the appropriate ink cartridge 14 is attached to the cartridge-attachment section 13, then any one of the first to fourth display sections 16, which corresponds to the concerning cartridge-attachment section 13, is turned on, for example, blue or green.

According to the attachable member-recognition device 11 constructed as described above, as shown in FIG. 2, for example, when the first ink cartridge 14 is progressively attached to the first cartridge-attachment section 13, then the tip 21d of the deformable section 21 is deformed by making contact with the wavy-shaped contact section 70a formed on the upper surface of the information-engraved section 70, and the stress is applied to the stress light-emitting section 27. When the stress is applied as described above, the stress light-emitting section 27 can emit the light having the intensity depending on the shape of the contact section 70a of the information-engraved section 70. The first light-receiving sensor 15 receives the light emitted by the stress light-emitting section 27 to generate the recognition signal corresponding to the shape of the contact section 70a of the information-engraved section 70. Accordingly, it is possible to recognize the information about the first cartridge-attachment section 13.

Therefore, the information-engraved sections 70 are provided for all of the ink cartridges 14 used in the ink-jet printer 12 respectively, and the shapes of the contact sections 70a, which are provided to deform the deformable sections 21 by the information-engraved sections 70, are formed to represent the information about the "ink color", the "cartridge volume", the "year of manufacture", and the "time of the year of manufacture" in relation to the respective ink cartridges 14. Accordingly, the light-receiving sensors 15, which are provided for the cartridge-attachment sections 13 to which the concerning ink cartridges 14 are attached, can generate the recognition signals corresponding to the shapes of the contact sections 70a of the information-engraved sections 70 provided for the attached ink cartridges 14.

Therefore, the recognition section included in the control unit 28 can recognize the installation of the ink cartridges 14 having the cartridge information of any type with respect to the first to fourth cartridge-attachment sections 13 respectively. It is possible to perform the processing in accordance with the recognition signals as described later on.

According to the attachable member-recognition device 11, the stress light-emitting section 27 emits the light when the stress is applied. Therefore, the stress light-emitting section 27 requires no electric wiring and no electric power. The structure is simple as compared with a case wherein any electric light-emitting device, which requires any electric wiring, is used. It is possible to reduce the cost.

As shown in FIG. 2, the contact section 70a of the information-engraved section 70, with which the tip 21d of the deformable section 21 makes contact, is formed such that the position in the direction (vertical direction as shown in FIG. 2) perpendicular to the direction of installation (horizontal direction as shown in FIG. 2) of the ink cartridge 14 is varied in accordance with the advance in the direction of installation.

When the ink cartridge 14 is progressively attached to the cartridge-attachment section 13, the information-engraved section 70 can deform the deformable section 21 in the predetermined interval or zone ranging from the start of the contact of the tip 21d of the deformable section 21 with the contact section 70a of the information-engraved section 70 to the completion of the installation of the ink cartridge 14. In other words, it is possible to perform both of the attaching operation for attaching the ink cartridge 14 to the cartridge-attachment section 13 and the deforming operation for deforming the deformable section 21 by the information-engraved section 70, simultaneously, in the same operation. Therefore, it is possible to recognize the information about the ink cartridge 14 with the simple and cheap structure without any labor of a user.

As shown in FIG. 2, the shape of the contact section 70a of the information-engraved section 70, with which the deformable section 21 makes contact, is formed to be the wavy shape. The light emission intensity of the light emitted by the stress light-emitting section 27 is changed to "turned off", "middle" and "strong" (see FIGS. 4 and 5) in accordance with the deformation of the deformable section 21. The light-receiving sensor 15 receives the light emitted by the stress light-emitting section 27 to generate the recognition signal corresponding to the light emission intensity of the light ("turned off", "middle" or "strong").

When the contact section 70a of the information-engraved section 70 is formed as described above, then the stress light-emitting section 27 can emit the light ("turned off", "middle" or "strong") having the different light emission intensity (luminance), and the light-receiving sensor 15 can generate the recognition signal corresponding to the light emission intensity of the light.

In other words, when it is intended to set the mutually different recognition signals, as shown in FIGS. 4 and 5, the light emission intensity of the light ("turned off", "middle" or "strong") can be included in the constitutive element of the recognition signal. It is possible to increase the number of the mutually different recognition signals corresponding thereto without increasing the areas P1 to P7. Accordingly, a relatively large number of pieces of the information about the ink cartridge 14 can be set on the information-engraved section 70.

Further, as shown in FIG. 4, when the ink cartridge 14 is attached to the cartridge-attachment section 13, then the tip 21d of the deformable section 21 firstly makes contact with the first area P1 of the information-engraved section 70 upon the start of the insertion, and the stress light-emitting section 27 emits the "strong" light. When the installation is completed, then the tip 21d of the deformable section 21 makes contact with the seventh area P7 of the information-engraved section 70, and the stress light-emitting section 27 emits the "middle" light.

As shown in FIG. 4, when the ink cartridge 14 attached to the cartridge-attachment section 13 is detached or taken out, then the tip 21d of the deformable section 21 firstly makes contact with the seventh area P7 of the information-engraved section 70 upon the start of the detachment, and the stress light-emitting section 27 emits the "middle" light. When the detachment is completed, then the tip 21d of the deformable section 21 makes contact with the first area P1 of the information-engraved section 70, and the stress light-emitting section 27 emits the "strong" light.

As described above, the information-engraved section 70 is formed so that the way of light emission of the stress light-emitting section 27 differs between when the ink cartridge 14 is attached to the cartridge-attachment section 13 and when the ink cartridge 14 is detached or taken out from the cartridge-attachment section 13. Therefore, it is possible to distinguish and recognize the installation of the ink cartridge 14 to the cartridge-attachment section 13 and the detachment of the ink cartridge 14 from the cartridge-attachment section 13.

Therefore, the cartridge information is read when the ink cartridge 14 is attached to the cartridge-attachment section 13. Further, when the ink cartridge 14 is detached or taken out, the detachment is recognized. When the ink cartridge 14 is subsequently attached to the cartridge-attachment section 13, the cartridge information is read. When the ink cartridge 14 is detached as described above, any one of the first to fourth display sections 16, which corresponds thereto, is turned off.

Next, the stress light-emitting section 27 will be explained. The stress light-emitting material, which forms each of the stress light-emitting sections 27, is, for example, a substance obtained by adding europium (Eu) (rare earth substance) as the light emission center to a base material of $Sr_3Al_2O_6$ (aluminic acid salt), or a substance obtained by adding neodymium (Nd) (transition metal substance) as the light emission center to a base material of $Ca_3Al_2O_6$ (aluminic acid salt). More specifically, the stress light-emitting material can be prepared by adding 0.6 wt % Eu to serve as the light emission center and 1 wt % boric acid as the flux to $Sr_3Al_2O_6$ as the base material, followed being sintered for about 4 hours at 1300° C. in a reducing atmosphere ($Ar+H_2$ 5%). The stress light-emitting material can be utilized by preparing a powder of the obtained product.

Other than the above, those usable as the stress light-emitting material include $Sr_{0.90}Al_2O_{3.90}{:}Eu_{0.01}$ (see Japanese Patent Application Laid-open No. 2000-63824), $Ca_2Al_2SiO_7{:}Ce$, $Ca_2MgSi_2O_7{:}Ce$ (see Japanese Patent Application Laid-open No. 2001-49251), and $ZnAl_2O_4{:}Mn$, $BaAl_2O_4{:}Ce$ (see Japanese Patent Application Laid-open No. 2001-64638).

As shown in FIG. 2, when the stress light-emitting section 27 is provided at the inner portion of the bent section 21c of the deformable section 21, then the powder of the stress light-emitting material and an adhesive such as those based on the epoxy having the light-transmissive property are mixed with each other to prepare a paste, and the paste is applied to the inner portion of the bent section 21c of the deformable section 21 to provide a predetermined thickness. In this way, the plate-shaped stress light-emitting section 27 is provided at the inner portion of the bent section 21c of the deformable section 21. Of course, the inner portion of the bent section 21c itself may be formed of the stress light-emitting section 27. In other words, the stress light-emitting section 27 and the bent section 21c may be formed integrally. In this case, there is no fear of any disengagement of the stress light-emitting section 27 from the bent section 21c.

Next, an explanation will be made with reference to FIG. 2 about the ink supply port 22 provided for the first ink cartridge 14 and the connecting tube 34 provided for the first cartridge-attachment section 13. However, the ink supply ports 22 and the connecting tubes 34 provided for the second to fourth ink cartridges 14 and the second to fourth cartridge-attachment sections 13 respectively are equivalent to those provided for the first ink cartridge 14 and the first cartridge-attachment sections 13, any explanation of which will be omitted.

As shown in FIG. 2, the ink supply port 22 is provided at the lower portion of the back wall section 14a of the first ink cartridge 14. The ink supply port is closed, for example, by a plate-shaped valve plug made of synthetic rubber from the inside. A packing is attached to the outer surface of the inner circumferential edge portion for forming the ink supply port 22. The connecting tube 34, which has a needle-shaped forward end portion, is arranged at a position opposed to the ink supply port 22. The proximal end portion of the connecting tube 34 is connected to a connecting hole 35 provided at a lower portion of the back wall section 13a of the first cartridge-attachment section 13. An ink supply tube 17 is connected to the connecting hole 35. Therefore, as shown in FIG. 2, when the first ink cartridge 14 is attached to the first cartridge-attachment section 13, then the forward end portion of the connecting tube 34 is inserted into the ink supply port 22, the valve plug 32 is forcibly opened, and thus the ink supply port 22 can be opened. Accordingly, the black ink 20, which is stored in the first ink cartridge 14, can be supplied to the head unit.

Figure 7:
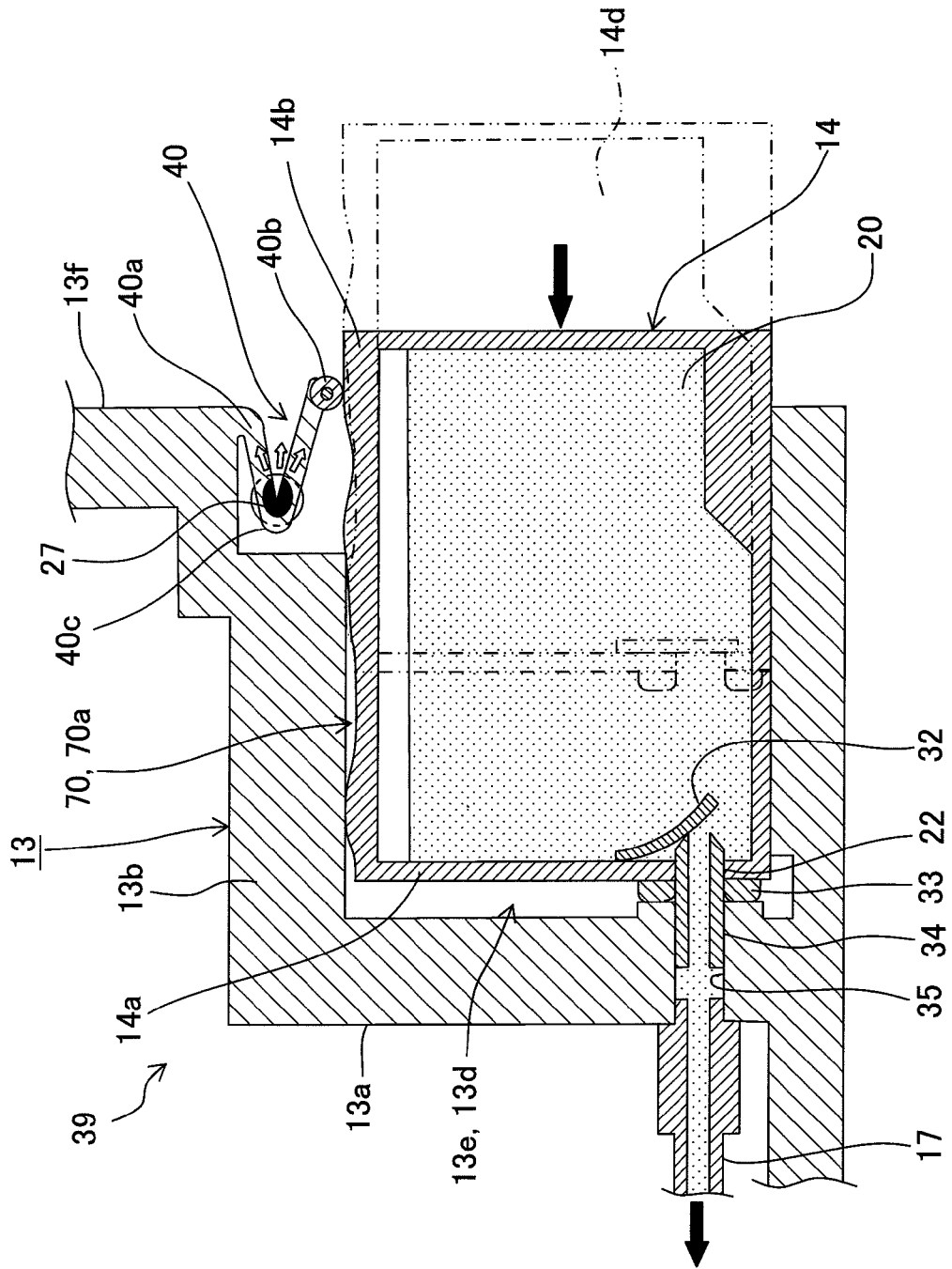
FIG. 7 shows a vertical sectional view illustrating an attachable member-recognition device and an ink cartridge according to a second embodiment of the present invention.

Next, an explanation will be made with reference to FIG. 7 about a second embodiment of an attachable member-recognition device and an attachable member according to the present invention. The attachable member-recognition device 39 and the ink cartridge 14 according to the second embodiment shown in FIG. 7 are different from the attachable member-recognition device 11 and the ink cartridge 14 according to the first embodiment shown in FIG. 2 in that the deformable sections 40, 21 are different from each other. The components or the parts other than the above are the same as or equivalent to those of the first embodiment shown in FIG. 2. Therefore, the same or equivalent portions are designated by the same reference numerals in the drawing, any explanation of which will be omitted.

The deformable section 40 shown in FIG. 7 is a member which has a substantially V-shaped form. A proximal end section 40a thereof is joined to the lower surface of the front wall section 13f of the first cartridge-attachment section 13, and a forward end section 40b thereof protrudes toward the information-engraved section 70 formed on the upper surface of the upper wall section 14b of the first ink cartridge 14 to be progressively attached to the first cartridge-attachment section 13. A roller is provided at the forward end section 40b.

The substantially V-shaped deformable section 40 extends in parallel to the side wall section 14d of the first ink cartridge 14, and the bent section 40c thereof protrudes toward the back side of the installation hole 13e of the first cartridge-attachment section 13.

As shown in FIG. 7, the deformable section 40 realizes the deformation-enhancing structure by means of the substantially V-shaped bent structure. The stress light-emitting section 27 is provided at the inner portion of the bent section 40c (stress-concentrating section). The deformable section 40 forms the deformation-enhancing structure, and hence the deformable section 40 is greatly deformed when the first ink cartridge 14 is attached to the first cartridge-attachment section 13 in the same manner as in the first embodiment. Therefore, the stress, which has a required magnitude or strength, can be applied to the stress light-emitting section 27. As a result, it is possible to emit the light at a required light emission intensity (luminance). Further when the roller is formed at a portion of the deformable section 40, the portion of the deformable section 40, which makes contact with the information-engraved section 70, can be allowed to correctly follow the information-engraved section 70 (the portion of the deformable section 40 is allowed to be kept contacting with the information-engraved section 70). Therefore, the stress light-emitting section 27 can be allowed to correctly emit the light at a desired intensity indicated by the shape of the information-engraved section 70.

Next, an explanation will be made with reference to FIGS. 8 and 9 about a third embodiment of an attachable member-recognition device and an attachable member according to the present invention. The attachment member-recognition device 63 and the printing paper tray 19 according to the third embodiment shown in FIGS. 8 and 9 are different from the attachment member-recognition device 11 and the ink cartridge 14 according to the first embodiment shown in FIG. 2 in the following points. That is, in the first embodiment shown in FIG. 2, the present invention is applied to the attachment member-recognition device 11 including the first to fourth ink cartridges 14 and the first to fourth cartridge-attachment sections 13 of the ink-jet printer 12. On the contrary, in the third embodiment shown in FIGS. 8 and 9, the present invention is applied to another attachment member-recognition device 63 including the printing paper tray (paper feed tray) 19 and the tray-attachment section 64 of the ink-jet printer 12.

Figure 8A:
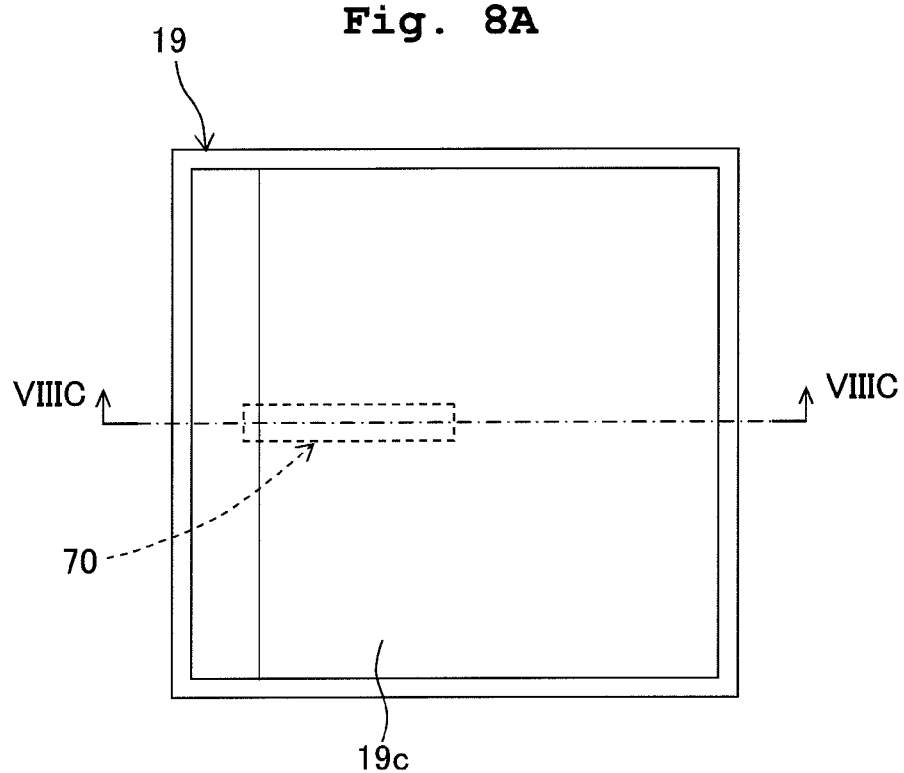
Figure 8B:
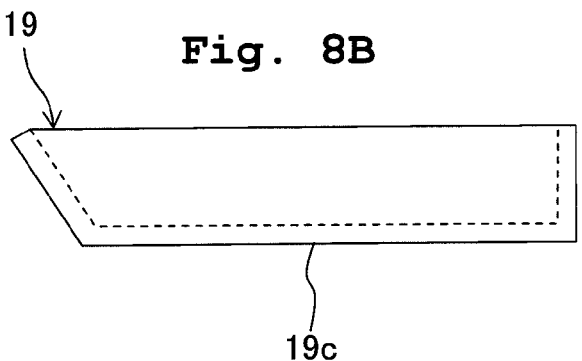
Figure 8C:
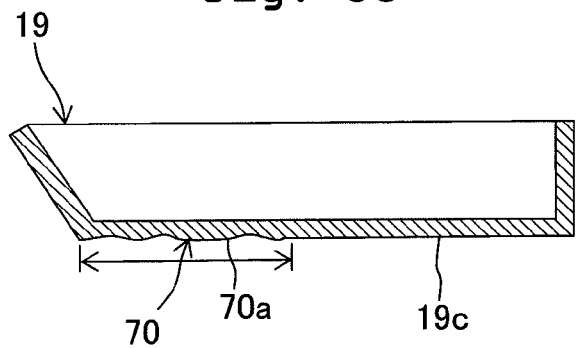
Figure 9:
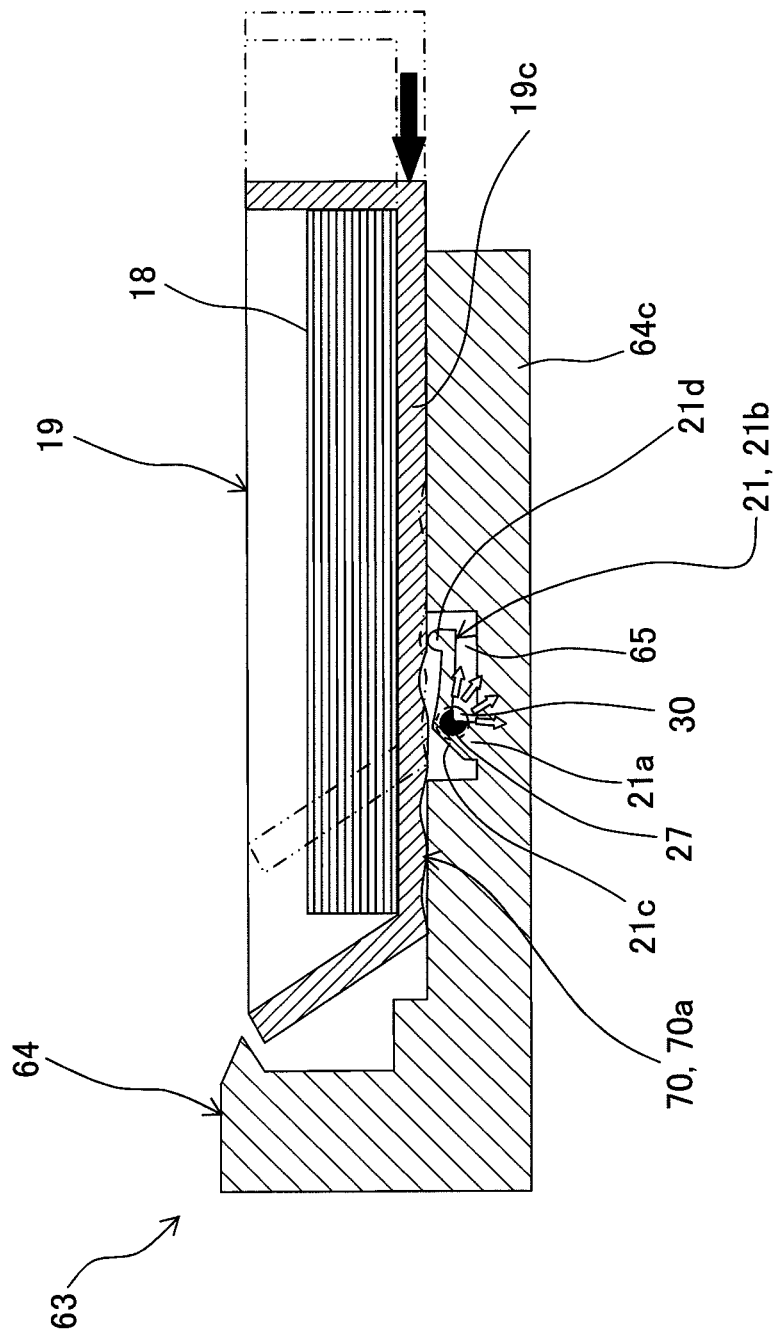
FIG. 9 shows a vertical sectional view illustrating the attachable member-recognition device and the printing paper tray according to the third embodiment.

As shown in FIGS. 8A, 8B, and 8C, the printing paper tray 19 of this embodiment is a dish-shaped member having a rectangular shape in a plan view. An information-engraved section 70 is provided on a lower surface of a center back side portion of a bottom wall section 19c. The information-engraved section 70 is equivalent to those described in the first embodiment. The information-engraved section 70 has a slender band-shaped form parallel to the direction in which the printing paper tray 19 is attached to a tray-attachment section 64. The information-engraved section 70 has the lower surface which is formed as a contact section 70a.

As shown in FIG. 9, the deformable section 21 is equivalent to those described in the first embodiment. The deformable section 21 is provided in a recess 65 provided on the upper surface of a bottom wall section 64c of the tray-attachment section 64. A tip 21d of the deformable section 21 is formed of a synthetic resin having an elastic property so that, at a predetermined contact pressure, the tip 21d of the deformable section 21 makes contact with the information-engraved section 70 formed on the lower surface of the printing paper tray 19 which is progressively attached to the tray-attachment section 64 or which is progressively detached or taken out from the tray-attachment section 64.

A stress light-emitting section 27 is provided on the inner side of a bent section 21c formed for the deformable section 21. The light, which is emitted by the stress light-emitting section 27, is received by the fifth light-receiving sensor 30.

The fifth light-receiving sensor 30 receives the light emitted by the stress light-emitting section 27 to generate a recognition signal corresponding to the light emission intensity of the light. As shown in FIG. 9, the fifth light-receiving sensor 30 is provided at the bottom wall section 64c of the tray-attachment section 64 at the position at which the fifth light-receiving sensor 30 can receive the light emitted by the stress light-emitting section 27 provided for the deformable section 21 while the printing paper tray 19 is progressively attached to the tray-attachment section 64 and while the printing paper tray 19 is progressively detached or taken out from the tray-attachment section 64. The fifth light-receiving sensor 30 is electrically connected to the control unit 28 which is provided for the ink-jet printer 12 in the same manner as in the first embodiment.

As shown in FIG. 6, the fifth light-receiving sensor 30 and the fifth display section 31 are electrically connected to the control unit 28 in addition to the first to fourth light-receiving sensors 15 and the first to fourth display sections 16. The control unit 28 is provided with the recognition section and the warning section. The recognition section and the warning section can recognize the information about the ink cartridges 14 when the first to fourth ink cartridges 14 are progressively attached to the first to fourth cartridge-attachment sections 13 in the same manner as in the first embodiment. The predetermined displays are displayed on the first to fourth display sections 16 and the sixth display section 68 on the basis of the result of the recognition. Further, when the printing paper tray 19 is progressively attached to the tray-attachment section 64, the information about the printing paper tray 19 can be recognized. The predetermined display is displayed on the fifth and sixth display sections 31, 68 on the basis of the result of the recognition.

As for the information about the printing paper tray 19, for example, the "printing paper size" is set as the "information item", and "A4", "B5", "B4" and the like are set as the "information contents". The "orientation of printing paper" is set as the "information item", and the "widthwise orientation" and the "lengthwise orientation" are set as the "information contents".

The information-engraved section 70 is formed so that the information as described above is signified or represented. When the printing paper tray 19 is attached to the tray-attachment section 13, it is possible to recognize the size of the printing paper accommodated in the printing paper tray 19 and the orientation of the accommodated printing paper. The processing can be performed in accordance with the recognition signal in the same manner as in the first embodiment.

For example, when the setting is now made for the ink-jet printer 12 such that the printing can be performed on the "A4" printing paper in the "widthwise orientation", if the printing paper tray 19, in which the "B5" printing paper 18 in the "widthwise orientation" is accommodated, is attached to the tray-attachment section 64, then it is displayed on the display section 68 that the printing paper tray 19 is not appropriate, and the fifth display section 31 is turned on red.

On the other hand, the setting is made such that if the printing paper tray 19, in which the "A4" printing paper 18 in the "widthwise orientation" is accommodated, is attached, then it is judged that the printing paper tray 19 is appropriate, and the fifth display section 31 is turned on blue or green. Further, when the printing paper tray 19 is detached or taken out, the fifth display section 31 is turned off.

The ink-jet printer 12 is provided with a fixing mechanism (not shown) in order to fix the printing paper tray 19 at the installation position when the printing paper tray 19 is forcibly pushed and inserted to arrive at the predetermined installation position of the tray-attachment section 64.

Figure 10:
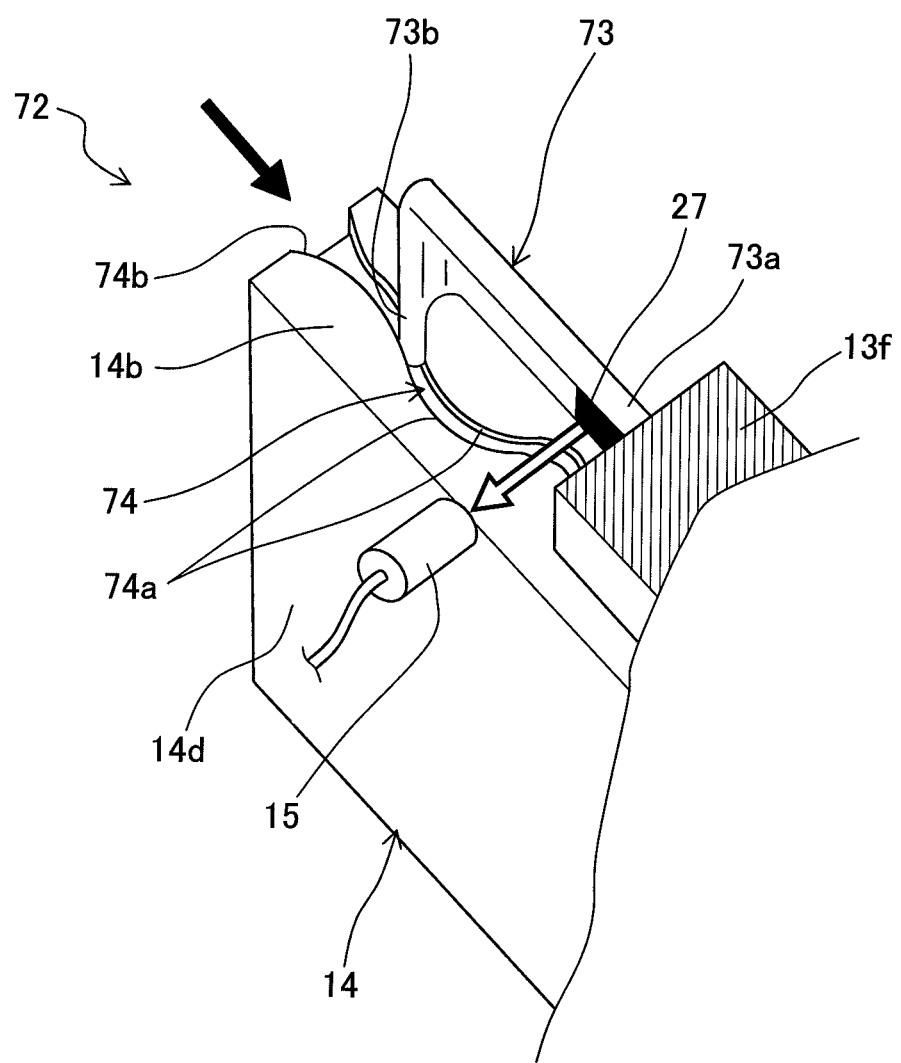
FIG. 10 shows a partial magnified perspective view illustrating an attachable member-recognition device and an ink cartridge according to a fourth embodiment of the present invention.

Next, an explanation will be made with reference to FIG. 10 about a fourth embodiment of an attachable member-recognition device and an attachable member according to the present invention. The attachable member-recognition device 72 and the ink cartridge 14 according to the fourth embodiment shown in FIG. 10 are different from the attachable member-recognition device 11 and the ink cartridge 14 according to the first embodiment shown in FIG. 2 in that the deformable sections 73, 21 are different from each other and the information-engraved sections 74, 70 are different from each other. The components or the parts other than the above are the same as or equivalent to those of the first embodiment shown in FIG. 2. Therefore, the same or equivalent portions are designated by the same reference numerals in the drawing, any explanation of which will be omitted.

The information-engraved section 74 shown in FIG. 10 is constructed by a groove formed on the upper surface of the upper wall section 14b of the ink cartridge 14. Respective inner side surfaces, which are disposed on the both sides for forming the groove, are contact sections 74a which are formed to have wavy shapes.

The deformable section 73 is formed to have an L-shaped form with its proximal end section 73a joined to the front wall section 13f of the cartridge-attachment section 13. The stress light-emitting section 27 is provided on the side surface of the proximal end section 73a of the deformable section 73. The light-receiving sensor 15 is attached to the upper wall section 13b (not shown) of the cartridge-attachment section 13 so that the light, which is emitted by the stress light-emitting section 27, can be received.

In the case of the attachable member-recognition device 72, when the ink cartridge 14 is progressively attached to the cartridge-attachment section 13, the forward end section 73b of the deformable section 73 enters an opening 74b disposed on the forward end side of the information-engraved section 74 formed as the groove. The forward end section 74b is guided in a state of being interposed on the both sides by the contact sections 74a, 74a formed on the respective inner side surfaces of the groove, and the forward end section 74b makes the swinging movement in the horizontal direction perpendicular to the direction of insertion. Accordingly, the flexible bending or warpage in the horizontal direction arises in the deformable section 73, and the stress is applied to the stress light-emitting section 27. The stress light-emitting section 27 emits the light at a light emission intensity depending on the degree of the change of the stress. The light is received by the light-receiving sensor 15. The ink cartridge 14, which is attached to the cartridge-attachment section 13, can be taken out from the cartridge-attachment section 13 by performing an operation opposite to the above.

The respective embodiments described above are illustrative of the exemplary case in which the present invention is applied to the ink cartridge 14 and the cartridge-attachment section 13 as well as the printing paper tray 19 and the tray-attachment section 64 of the ink-jet printer 12. However, other than the above, the present invention is applicable, for example, to ink cartridges 14 and cartridge-attachment sections 13 as well as printing paper trays 19 and tray-attachment sections 64 of, for example, copying machines and facsimiles.

In the respective embodiments described above, as shown in FIGS. 3 and 4, the contact section 70a is comparted into the first to seventh areas P1 to P7 in the direction in which the deformable section 21 makes the sliding movement while making contact with the contact section 70a of the information-engraved section 70. The light emission intensity ("strong", "middle", "turned off") of the light emitted by the stress light-emitting section 27 provided for the deformable section 21 is detected for each of the areas P1 to P7, and thus the information about the ink cartridge 14 is read and recognized. However, the following arrangement is also available in place thereof. That is, the number of times of light emission, the light emission duration time, or the light emission time interval of the light emitted by the stress light-emitting section 27 is detected for each of the first to seventh areas P1 to P7, and thus the information about the ink cartridge 14 is read and recognized.

When the light emission time or the light emission time interval is detected, for example, the time, which ranges from the timing of the detection of the light having the "strong" light emission intensity in the first area P1 shown in FIG. 3A to the timing of the detection of the light having the "middle" light emission intensity in the seventh area P7, can be set as the reference time to detect the light emission duration time or the light emission time interval for each case.

In the above discussion, with respect to each of the first to seventh area P1 to P7, the number of times of light emission, the light emission duration time, the light emission time interval, or the light emission intensity of the light emitted by the stress light-emitting section 27 is detected. However, in place thereof, regarding the first to seventh areas P1 to P7 as a whole, the whole number of times of light emission, the whole light emission duration time, the whole light emission time interval, or the whole light emission intensity of the light emitted by the stress light-emitting section 27 may be detected so that the whole number of times of light emission of the light or the like represents the information about the ink cartridge.

An identifier or identification data, which indicates the partition between the respective areas, may be provided at the portion of the contact section 70a corresponding to the boundary of each of the first to seventh areas P1 to P7. For example, when a small projection is formed as the identifier (discriminator), the stress light-emitting section 27 emits the light in a pulse form when the deformable section abuts against the projection. The pulse-shaped light emission can be detected to distinguish the first to seventh areas P1 to P7 from each other. In this case, it is possible to correctly grasp the number of continuously provided no light emission areas, for example, when the areas, which correspond to no light emission, are continued. The identifier is not limited to the small projection. It is possible to set any arbitrary shape provided that the shape can allow the stress light-emitting section 27 to emit the light in a predetermined pattern.

In the embodiment described above, the seven areas (first to seventh areas P1 to P7) are formed for the information-engraved section. However, the present invention is not limited thereto. It is possible to form an arbitrary number of the areas.

In the respective embodiments described above, for example, as shown in FIG. 2, the light-receiving sensor 15 is provided at the cartridge-attachment section 13. However, the light-receiving sensor 15 may be provided at any portion other than the cartridge-attachment section 13. For example, the light, which is emitted by the stress light-emitting section 27, may be received by a light-receiving end of an optical guide member such as an optical fiber, and the received light may be transmitted to and received by the light-receiving sensor 15 provided at any portion other than the cartridge-attachment section 13.

As described above, the attachable member-recognition device and the attachable member according to the present invention have such an excellent effect that the information about the attachable member including, for example, the ink cartridge and the printing paper tray can be set with the relatively cheap and simple structure, and the information can be recognized. The present invention is appropriate to be applied to the attachable member-recognition device and the attachable member as described above.

What is claimed is:

1. An attachable member-recognition device comprising:
   an attachable member in which an information-engraved section having a predetermined shape is formed;
   an attachment section to which the attachable member is detachably attached;
   a deformable section which is provided on the attachment section and which is configured to slide on the information-engraved section of the attachable member to deform when the attachable member is attached to the attachment section;
   a stress light-emitting portion which is provided with the deformable section and which receives a force, when the deformable section slides on the information-engraved section, to emit a light, an intensity of the light depending on the shape of the information-engraved section; and
   a light-receiving sensor which receives the light emitted by the stress light-emitting section and which generates a recognition signal corresponding to the shape of the information-engraved section,
   wherein the stress light-emitting portion is provided in the deformable section at a portion at which a stress is most concentrated when the deformable section is brought into contact with the information-engraved section and causes the force to be received by the stress light-emitting portion.

2. The attachable member-recognition device according to claim 1, wherein the information-engraved section is formed so that when the attachable member is attached to the attachment section, the stress light-emitting section emits the light in a first pattern, and that when the attachable member is detached from the attachment section, the stress light-emitting section emits the light in a second pattern which is different from the first pattern.

3. The attachable member-recognition device according to claim 1, wherein the attachable member is one of an ink cartridge and a printing paper tray.

4. The attachable member-recognition device according to claim 1, wherein a roller is formed at a portion of the deformable section which is brought into contact with the information-engraved section.

5. The attachable member-recognition device according to claim 1, wherein the stress light-emitting portion has a sheet-shaped form; and
   the sheet shaped stress light-emitting portion is provided on the deformable section at the portion at which the stress is most concentrated.

6. The attachable member-recognition device according to claim 1, wherein the stress light-emitting portion is formed integrally with the deformable section.

7. The attachable member-recognition device according to claim 1, wherein the information-engraved section has a contact portion with which the deformable section is brought into contact; and
   a height, of the contact portion, in a direction perpendicular to an attaching direction in which the attachable member is attached, is undulated in the attaching direction.

8. The attachable member-recognition device according to claim 7, wherein a shape of the contact portion is formed such that the intensity of the light emitted by the stress light-emitting portion is varied by deformation of the deformable section; and the recognition signal generated by the light-receiving sensor corresponds to the intensity of the light after receiving the light emitted by the stress light-emitting portion.

9. The attachable member-recognition device according to claim 1, wherein the deformable section has a substantially L-shaped bent structure having an end portion which has a tip which is brought into contact with the information-engraved section during an attachment of the attachable member, a base portion, and a bent portion which joins the end portion and the base portion; and the stress light-emitting portion is provided on an inner side of the bent portion.

10. The attachable member-recognition device according to claim 9, wherein the tip of the end portion is pressed against the information-engraved section by an elastic deformation caused at the end portion when the end portion is brought into contact with the information-engraved section during the attachment of the attachable member.

11. The attachable member-recognition device according to claim 1, wherein the attachable member is formed as a plurality of individual attachable members;

each of the individual attachable members has the information-engraved section; and the light-receiving sensor is capable of generating the recognition signal as a plurality of recognition signals depending on the information-engraved sections, respectively, the apparatus further comprising a recognition section which distinguishes and recognizes the recognition signals.

12. The attachable member-recognition device according to claim 11, further comprising:

a storage section which stores known data corresponding to the recognition signals; and a warning mechanism which generates a predetermined warning signal, wherein the recognition section compares a recognition signal among the recognition signals generated by the light-receiving sensor with the known data to judge whether or not the recognition signal and the known data are different from each other, and causes the warning mechanism to generate the warning signal when the recognition section judges that the recognition signal and the known data are different from each other.

13. The attachable member-recognition device according to claim 11, wherein the information-engraved section is formed such that the stress light-emitting portion emits the light in one of conditions including a predetermined number of times of light emission, a predetermined light emission duration time, a predetermined light emission time interval, and a predetermined light emission intensity.

14. An ink-jet printer which jets an ink onto a medium to perform printing, the ink-jet printer comprising:

the attachable member-recognition device as defined in claim 1;

an ink-jet head which jets the ink onto the medium; and a transport mechanism which transports the medium.

15. The ink-jet printer according to claim 14, wherein the attachable member is one of an ink cartridge which stores the ink and a tray which accommodates the medium.

* * * * *